US009276482B2

(12) United States Patent
Sato (10) Patent No.: US 9,276,482 B2
(45) Date of Patent: Mar. 1, 2016

(54) FORWARD TYPE DC-DC CONVERTER (71) Applicant: FUJI ELECTRIC CO., LTD., Kawasaki-shi (JP)

(72) Inventor: Tadahiko Sato, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 527 days.

(21) Appl. No.: 13/649,101

(22) Filed: Oct. 10, 2012

(65) Prior Publication Data
US 2013/0094252 A1    Apr. 18, 2013

(30) Foreign Application Priority Data

Oct. 18, 2011   (JP) ................................. 2011-228544

(51) Int. Cl.
H02M 3/335    (2006.01)

(52) U.S. Cl.
CPC ...... *H02M 3/33553* (2013.01); *H02M 3/33592* (2013.01); *Y02B 70/1475* (2013.01)

(58) Field of Classification Search
CPC ..................... H02M 3/33592; H02M 3/33553; Y02B 70/1475
USPC ...................................... 363/21.06
See application file for complete search history.

(56) References Cited

U.S. PATENT DOCUMENTS

| 6,026,005 | A | 2/2000 | Abdoulin | |
| 6,618,274 | B2* | 9/2003 | Boylan et al. | 363/21.06 |
| 7,161,813 | B2* | 1/2007 | Librizzi et al. | 363/21.06 |
| 2004/0037099 | A1 | 2/2004 | Nishikawa | |
| 2005/0174819 | A1* | 8/2005 | Yang | 363/127 |
| 2008/0137379 | A1* | 6/2008 | Mao | 363/21.06 |
| 2009/0161396 | A1* | 6/2009 | Lin et al. | 363/125 |

FOREIGN PATENT DOCUMENTS

| JP | 08-098523 A | 4/1996 |
| JP | 11-069805 A | 3/1999 |
| JP | 11-206118 A | 7/1999 |
| JP | 2003-102172 A | 4/2003 |
| JP | 2004-032937 A | 1/2004 |

OTHER PUBLICATIONS

Japanese Office Action with translation dated Jun. 2, 2015.

* cited by examiner

*Primary Examiner* — Jue Zhang
(74) *Attorney, Agent, or Firm* — Rabin & Berdo, P.C.

(57) ABSTRACT

With the use of a voltage across a secondary winding of a transformer, a DC output voltage and a conduction time width of a current in the DC reactor on the secondary side circuit in an immediately preceding period, the turning-on time width and the turning-off time width of a synchronous rectification MOSFET in the secondary side circuit of the transformer are obtained by calculations, without receiving any signals from a primary side circuit, to thereby carry out control of a synchronous rectification circuit in a forward DC-DC converter with the time in which a current flows in a diode reduced to the minimum.

15 Claims, 7 Drawing Sheets

FORWARD TYPE DC-DC CONVERTER

CROSS-REFERENCE TO RELATED APPLICATION

This application is based on, and claims priority to, Japanese Patent Application No. 2011-228544, filed on Oct. 18, 2011, contents of which are incorporated herein by reference.

BACKGROUND OF INVENTION

1. Field of the Invention

The present invention relates to a DC-DC converter that converts a DC power supply voltage to produce another DC voltage insulated from the DC power supply voltage and particularly to a controller of a synchronous rectifier circuit that rectifies a voltage of a secondary winding of a transformer in the DC-DC converter.

2. Background Art

Figure 6A:
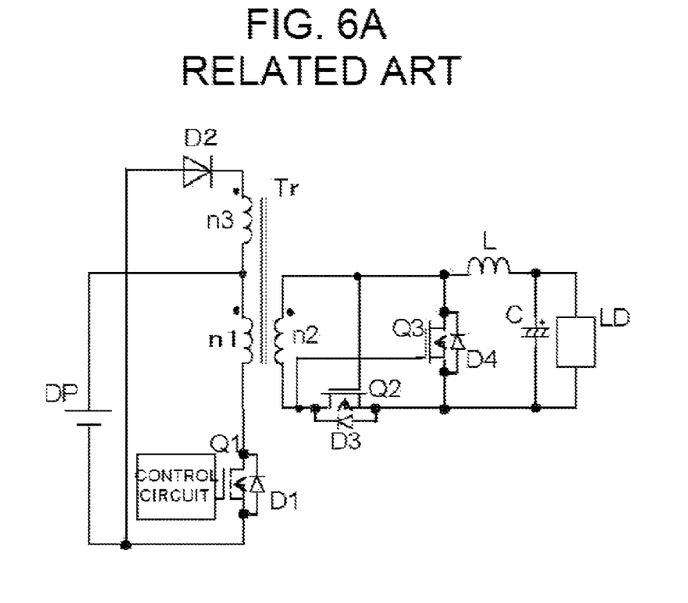
FIGS. 6A to 6C are circuit diagrams showing circuits of examples of related forward DC-DC converter circuits each of which uses a synchronous rectifier circuit using related art.
Figure 6B:
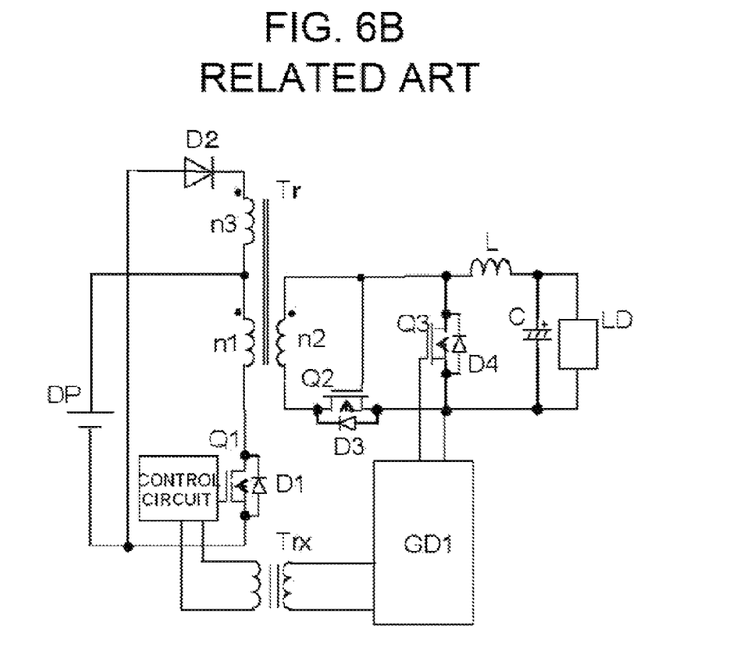
Figure 6C:
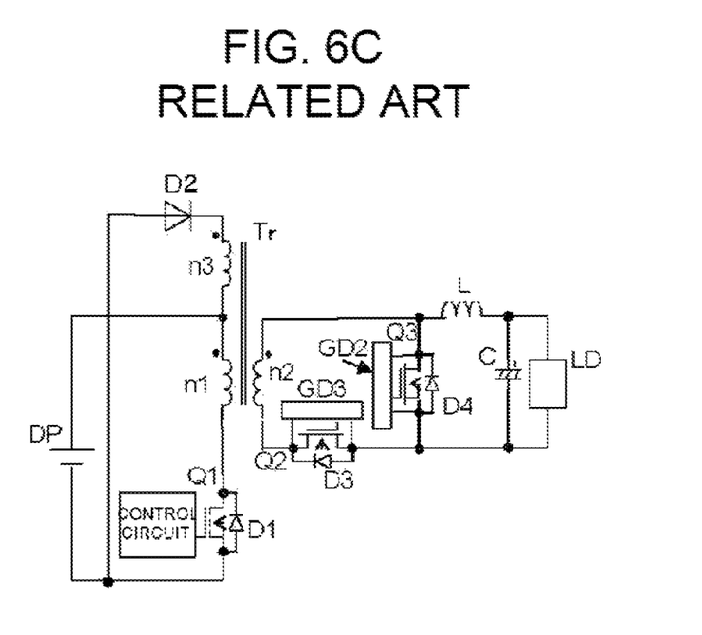

In FIGS. 6A to 6C, examples of related forward type DC-DC converter circuits are shown each of which uses a synchronous rectifier circuit using related art. FIG. 6A is a circuit diagram showing a one-transistor type DC-DC converter circuit including a main (hereinafter referred to as "primary") winding n1 and a magnetic resetting (hereinafter referred to as "tertiary") winding n3 on the primary circuit side of a transformer Tr and a synchronous rectifier circuit on the secondary winding n2 side. The circuit is that described in Japanese Patent No. 4,094,727.

In the DC-DC converter circuit, a series circuit of the primary winding n1 of the transformer Tr and a semiconductor switch (here, a MOSFET) Q1, to which a diode D1 is connected in inverse parallel, is connected in parallel to a DC power supply DP. Moreover, between the other end of the tertiary winding n3, connected in series to the primary winding n1, and the negative electrode of the DC power supply DP, a diode D2 is connected. The secondary winding n2 of the transformer Tr is connected in parallel to a series circuit in which the source terminal of a synchronous rectification MOSFET Q2, to which a diode D3 is connected in inverse parallel, and the source terminal of a freewheeling MOSFET Q3, to which a diode D4 is connected in inverse parallel, are connected. In addition, across the MOSFET Q3, a smoothing filter is connected in parallel which is formed of a series circuit of a reactor L and a capacitor C. Furthermore, across the capacitor C, a DC load LD is connected in parallel. The gate terminal of the synchronous rectification MOSFET Q2 is connected to the one end of the secondary winding n2 and the gate terminal of the freewheeling MOSFET Q3 is connected to the other end of the secondary winding n2.

In such a configuration, the turning-on of the MOSFET Q1 induces a voltage across the secondary winding n2 of the transformer Tr to allow a current to flow along a path of the reactor L→the parallel circuit of the capacitor C and the load LD→the diode D3 to supply DC electric power to the load LD, by which DC electric power is supplied to the load LD. By giving a turning-on signal to the MOSFET Q2 in this mode, the current in the diode D3 is commutated to the MOSFET Q2.

Subsequent to this, the turning-off of the MOSFET Q1 allows the excitation energy of the transformer Tr to be absorbed in the DC power supply DP through the diode D2 and the resetting winding n3. Moreover, in the circuit on the secondary winding n2 side, by turning-off the rectifying MOSFET Q2 and simultaneously turning-on the freewheeling MOSFET Q3, the current in the reactor L is brought into a freewheeling condition along a path of the parallel circuit of the capacitor C and the load LD→the parallel circuit of the diode D4 and the MOSFET Q3→the reactor L and is made reduced. This, compared with the case without the use of the MOSFETs Q2 and Q3, reduces a forward voltage drop, by which a conduction loss can be therefore made reduced.

In the driving system, the rising of the gate driving signal for each of the MOSFETs Q2 and Q3 becomes slower compared with the rising of the current in each of the rectifying diode D3 and the freewheeling diode D4. This lengthens the time in which a current flows in each of the diodes to cause small effect of loss reduction. For solving the disadvantage, in the circuit described in Japanese Patent No. 4,094,727, a PLL (Phase-locked-loop) circuit is used to generate a signal with the phase thereof leading to the phase of the voltage across the secondary winding n2 of the transformer Tr for being served as the driving signal of the MOSFET.

FIG. 6B is a circuit diagram showing the circuit described in JP-A-11-206118 as an example of related art. The circuit has a configuration in which from a control circuit of a gate driving signal for the primary side MOSFET Q1, an additional signal is transmitted to the secondary winding n2 side of a transformer Tr through a signal insulating transformer Trx and a gate driving circuit GD1 to be applied as a driving signal to the gate of a MOSFET Q3 connected in inverse parallel to a freewheeling diode D4. The driving signal, compared with the rising of the voltage across the secondary winding n2 of the transformer Tr, has a rising in a leading phase. Thus, compared with the example of the related circuit shown in FIG. 6A, the time in which a current flows in the diode D4 can be reduced to reduce a conduction loss.

FIG. 6C is a circuit diagram showing the circuit described in Japanese Patent No. 3,991,785 as an example of related art. On the secondary winding n2 side of the transformer Tr, in parallel to the MOSFET Q2, a gate driving circuit GD3 is connected which detects the direction of a current to drive the MOSFET Q2 and, in parallel to the MOSFET Q3, a gate driving circuit GD2 is connected which is identical to the gate driving circuit GD3. The gate driving circuits GD2 and GD3 have the circuit configurations identical to each other. The gate driving circuits GD2 and GD3 detect that the cathode potentials of the diode D4 and D3 lower compared with the anode potentials thereof when currents begin to flow in the forward directions of the diodes D4 and D3 so as to immediately apply driving signals to the gates of the MOSFETs Q3 and Q2, respectively. The circuit has the advantage of requiring no insulating transformer to simplify the circuit configuration compared with the circuit shown in FIG. 6B.

Patent Document 1: Japanese Patent No. 4,094,727
Patent Document 2: JP-A-11-206118
Patent Document 3: Japanese Patent No. 3,991,785

As was explained in the foregoing, the synchronous rectifier circuits have various kinds of configurations in their driving systems. For improving the conversion efficiency of a synchronous rectifier circuit, it is important to shorten the time to the utmost in which a current flows in the forward direction of a diode and to interrupt a reverse current at the switching of a diode and a feedthrough current of a MOSFET. Thus, it is necessary to optimize the timing of making the MOSFETs in the synchronous rectifier circuit turned-on and -off.

In the example of the related synchronous rectifier circuit shown in Patent Document 1, the use of the PLL circuit providing phase lead of the voltage across the winding of the transformer enables synchronous rectification with high conversion efficiency. However, the PLL circuit causes a delay of more than one period in the response thereof, which makes it impossible for the PLL circuit to respond to an abrupt variation in an input voltage or in a load to result in an increase in a loss.

In the example of the related synchronous rectifier circuit shown in FIG. 6B, a transformer is required for insulating a signal in the primary side circuit from the secondary side circuit, which increases the number of parts and the area of surface mounting. In the example of the related synchronous rectifier circuit shown in FIG. 6C, when change in current with respect to time di/dt ("i" represents a current and "t" represents time) is large, delay in detection is caused which produces a flow of a reverse current or a feedthrough current to lower the conversion efficiency of the circuit.

Accordingly, it is an object of the invention to provide a forward DC-DC converter to which a driving circuit is applied that can reduce a loss in a secondary synchronous rectifier circuit without receiving any signal from a primary circuit.

SUMMARY OF THE INVENTION

For solving the problems and achieving the object of the invention, a first aspect of the invention relates to a forward type DC-DC converter including: a series circuit of a primary side semiconductor switch and a primary winding of a transformer, the series circuit being connected in parallel to the DC input power supply; a rectifying diode rectifying the voltage across a secondary winding of the transformer; and a smoothing filter comprising a DC reactor and a smoothing capacitor. The smoothing filter smoothes the output voltage of the rectifying diode. The forward type DC-DC converter further includes: a freewheeling diode freewheeling the current in the DC reactor; a first MOSFET connected in inverse parallel to the rectifying diode; and a second MOSFET connected in inverse parallel to the freewheeling diode. The voltage across the smoothing capacitor is served as a DC output, and the DC output voltage is controlled by turning-on and -off operations of the first MOSFET and the second MOSFET based on the periodical turning-on and -off operations of the primary side semiconductor switch. The forward DC-DC converter further includes an arithmetic circuit in which the turning-on time width of the first MOSFET is calculated by the use of a time width within which a current flows in the DC reactor on the secondary side within the turning-off time width of the primary side semiconductor switch in the previous period, the voltage of the DC output and the voltage across the secondary winding of the transformer. The turning-on time width of the second MOSFET is calculated by the use of the turning-on time width of the primary side semiconductor switch immediately before the turning-on of the second MOSFET, the voltage of the DC output, and the voltage across the secondary winding of the transformer.

A second aspect of the invention is that in the first aspect, the turning-on time width of the primary side semiconductor switch is obtained by detecting a timing at which the voltage across the secondary winding of the transformer varies by the turning-on of the primary side semiconductor switch to perform zero-crossing with the zero level of the voltage. The turning-off time width of the primary side semiconductor switch is obtained by detecting a timing at which the voltage across the secondary winding of the transformer varies by the turning-off of the primary side semiconductor switch to perform zero-crossing with the zero level of the voltage.

A third aspect of the invention is that in the first or the second aspect, the timing of turning-on the first MOSFET is determined on the basis of the result of a decision on the polarity of the voltage across the secondary winding of the transformer and the result of the decision as to whether or not the voltage across the first MOSFET is near zero. The timing of turning-on the second MOSFET is determined on the basis of the result of a decision on the polarity of the voltage across the secondary winding of the transformer and the result of the decision as to whether or not the voltage across the second MOSFET is near zero.

A fourth aspect of the invention is that in any one of the first to the third aspects, the voltage across the secondary winding of the transformer is obtained by the difference between the voltage across the first MOSFET and the voltage across the second MOSFET.

A fifth aspect of the invention is that in any one of the first to the fourth aspects, the voltage across the first MOSFET and the voltage across the second MOSFET are detected within the turning off time width of the primary side semiconductor switch and, when both of the detected voltage across the first MOSFET and the detected voltage across the second MOSFET are negative voltages lower than a certain voltage near zero, a decision is made that the mode of the current in the DC reactor is in a discontinuous mode in which the current is intermittent.

In the invention, with the use of a voltage across a secondary winding of a transformer, a DC output voltage and a conduction time width of a current in the DC reactor on the secondary side circuit in an immediately preceding period, the turning-on time width and the turning-off time width of a synchronous rectification MOSFET in the secondary side circuit of the transformer are obtained by calculations without receiving any signals from a primary side circuit.

As a result, the optimum driving of a synchronous rectifier circuit becomes possible to enable a forward DC-DC converter with a high conversion efficiency to be provided.

DETAILED DESCRIPTION

The key point of the invention is that in the secondary side synchronous rectification circuit in an insulation type forward DC-DC converting circuit using a transformer, an arithmetic circuit is further included. In the arithmetic circuit, the turning-on time width of a first MOSFET, connected in inverse parallel to a rectifying diode, is calculated by the use of a time width within which a current flows in the DC reactor on the secondary side within the turning-off time width of the primary side semiconductor switch in the previous period, the voltage of the DC output and the voltage across the secondary winding of the transformer. The turning-on time width of a second MOSFET, connected in inverse parallel to a freewheeling diode, is calculated by the use of the turning-on time width of the primary side semiconductor switch immediately before the turning-on of the second MOSFET, the voltage of the DC output, and the voltage across the secondary winding of the transformer.

Figure 1:
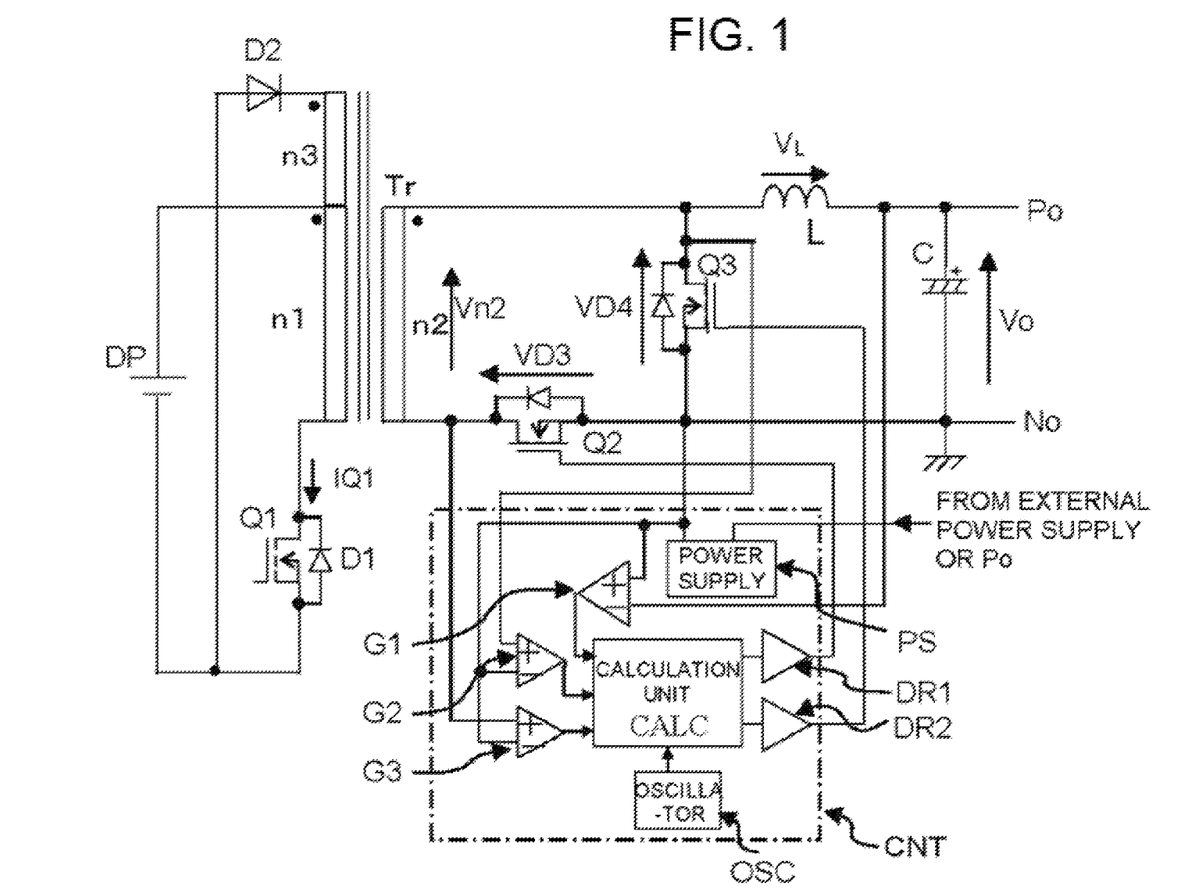
FIG. 1 is a circuit diagram showing an example of an embodiment of the invention.

FIG. 1 is a circuit diagram showing an example of an embodiment of the invention. The diagram shows configurations of a main circuit and a control circuit of the forward type DC-DC converter. The configuration of the main circuit is similar to that of the related art. Thus, explanations will be made with respect to the control circuit CNT only. In the diagram, a voltage across the secondary winding n2 of a transformer Tr is denoted by Vn2, a voltage across a rectifying MOSFET Q2 is denoted by VD3, a voltage across a freewheeling MOSFET Q3 is denoted by VD4, a DC output voltage is denoted by Vo and a voltage across a reactor L is denoted by VL. The control circuit CNT is formed of a DC output voltage detector G1, a detector G2 of the voltage across the MOSFET Q3, a detector G3 of the voltage across the MOSFET Q2, a calculation unit CALC, a high frequency oscillator OSC for timing detection, a control circuit power supply PS, a driving circuit DR1 for the MOSFET Q2 and a driving circuit DR2 for the MOSFET Q3. Here, the input of the control circuit power supply PS is connected to an external power supply or the positive electrode Po for the DC output voltage Vo.

Here, the principle for calculating out the time width of the gate driving signal of each of the MOSFETs Q2 and Q3 in such a configuration will be explained.

Letting the voltage across the secondary winding n2 of a transformer Tr be Vn2 and the voltage across a reactor L be VL, the following relational expressions are obtained:

$$Vn2=VD4=VD3$$

$$VL=Vo-VD4.$$

Figure 2:
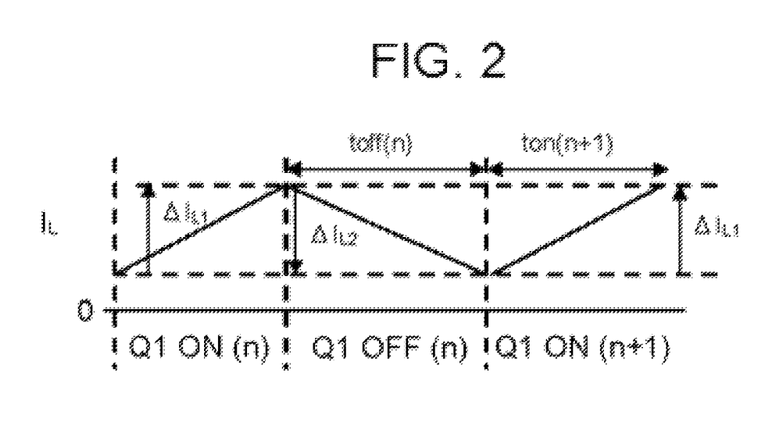
FIG. 2 is a waveform diagram for illustrating the principle of operation of the circuit shown in FIG. 1.

Moreover, letting a current flowing in the reactor L be IL, the turning-on time width of the MOSFET Q1 be ton, the current change width of the current IL in the reactor L within the turning-on time width ton be $\Delta IL1$, the turning-off time width of the MOSFET Q1 be toff, the conduction time width of the current IL in the reactor L within the turning-off time width toff of the MOSFET Q1 be toff', the current change width in the current IL in the reactor L at this time be $\Delta IL2$ and the inductance of the reactor L be La, the change in the current IL in the reactor L becomes as shown in FIG. 2, a waveform diagram for illustrating the principle of operation of the circuit shown in FIG. 1.

Namely, the current change width $\Delta IL1$ of the current IL in the reactor L when the MOSFET Q1 is turned-on becomes $$\Delta IL1=ton \times VL/La=ton \times (Vn2-Vo)/La$$

and the current change width $\Delta IL2$ of the current IL in the reactor L when the MOSFET Q1 is turned-off becomes $$\Delta IL2=toff' \times Vo/La.$$

In a steady state, $\Delta IL1$ and $\Delta IL2$ are equal to each other as being $\Delta IL1=\Delta IL2$. Therefore, the turning-on time width ton (n) of the MOSFET Q1 in the n-th switching period becomes as $$ton(n)=toff'(n-1) \times Vo/(Vn2-Vo). \quad (1)$$

Similarly, the conduction time width toff'(n) of the current IL in the reactor L in the n-th switching period becomes as $$toff'(n)=ton(n) \times (Vn2-Vo)/Vo. \quad (2)$$

However, when the current IL in the reactor L is continuous through one period, toff'(n) becomes as $$toff'(n)=toff(n) \quad (3)$$

and, when the current IL in the reactor L is discontinuous, toff'(n) becomes as $$toff'(n)<toff(n). \quad (4)$$

As was explained in the foregoing, the turning-on time width ton(n) of the MOSFET Q1 in the n-th switching period can be obtained from the conduction time width toff' (n−1) of the reactor current IL within the turning-off time width of the MOSFET Q1 in the immediately preceding period as is understood from the expression (1).

Similarly, it is understood that the conduction time width toff' (n) of the reactor current IL in the n-th switching period can be obtained from the turning-on time width ton (n) of the MOSFET Q1 in the period as is understood from the expression (2).

Figure 3:
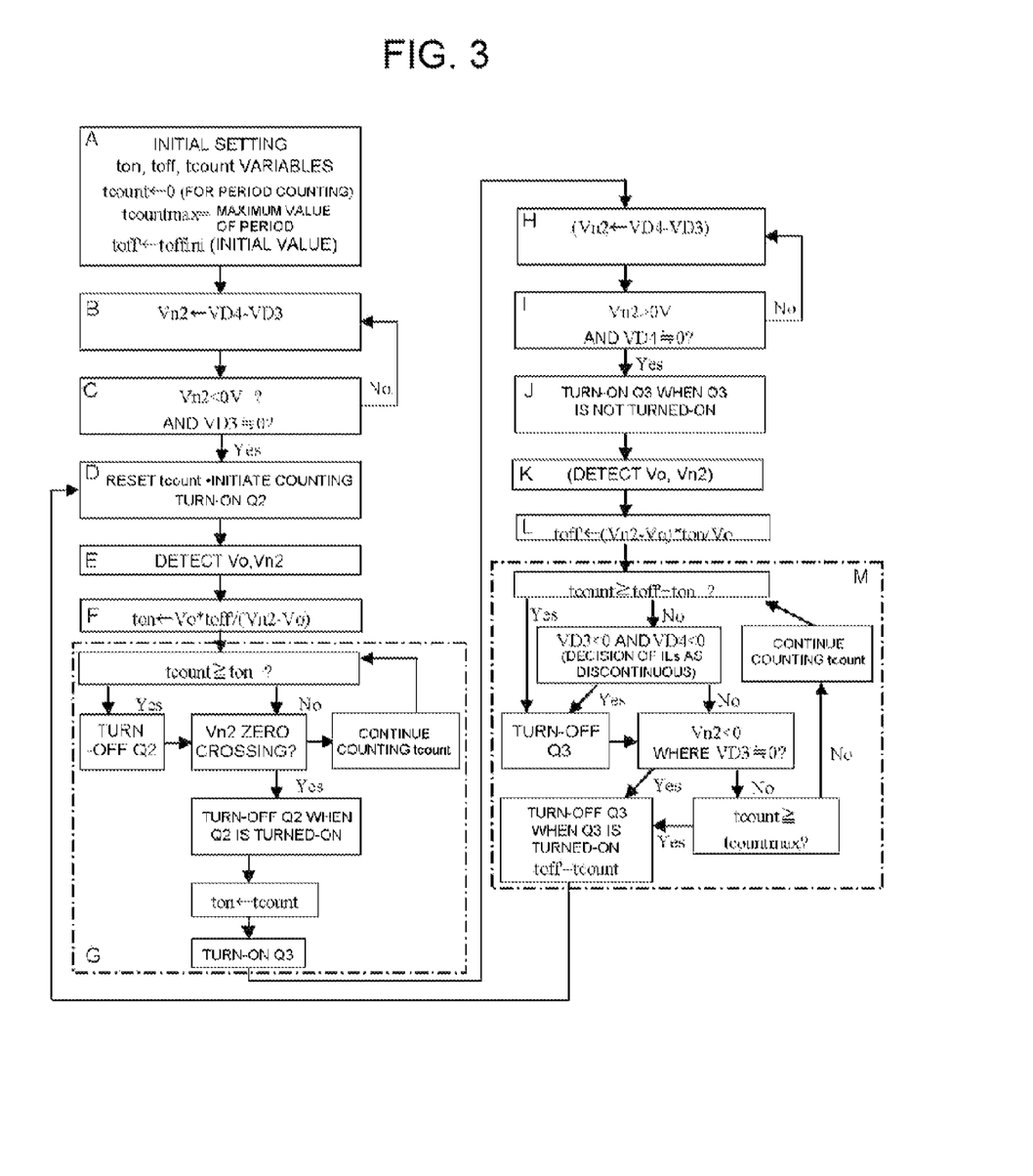
FIG. 3 is a control chart of the example for actualizing the principle of the invention.
Figure 4:
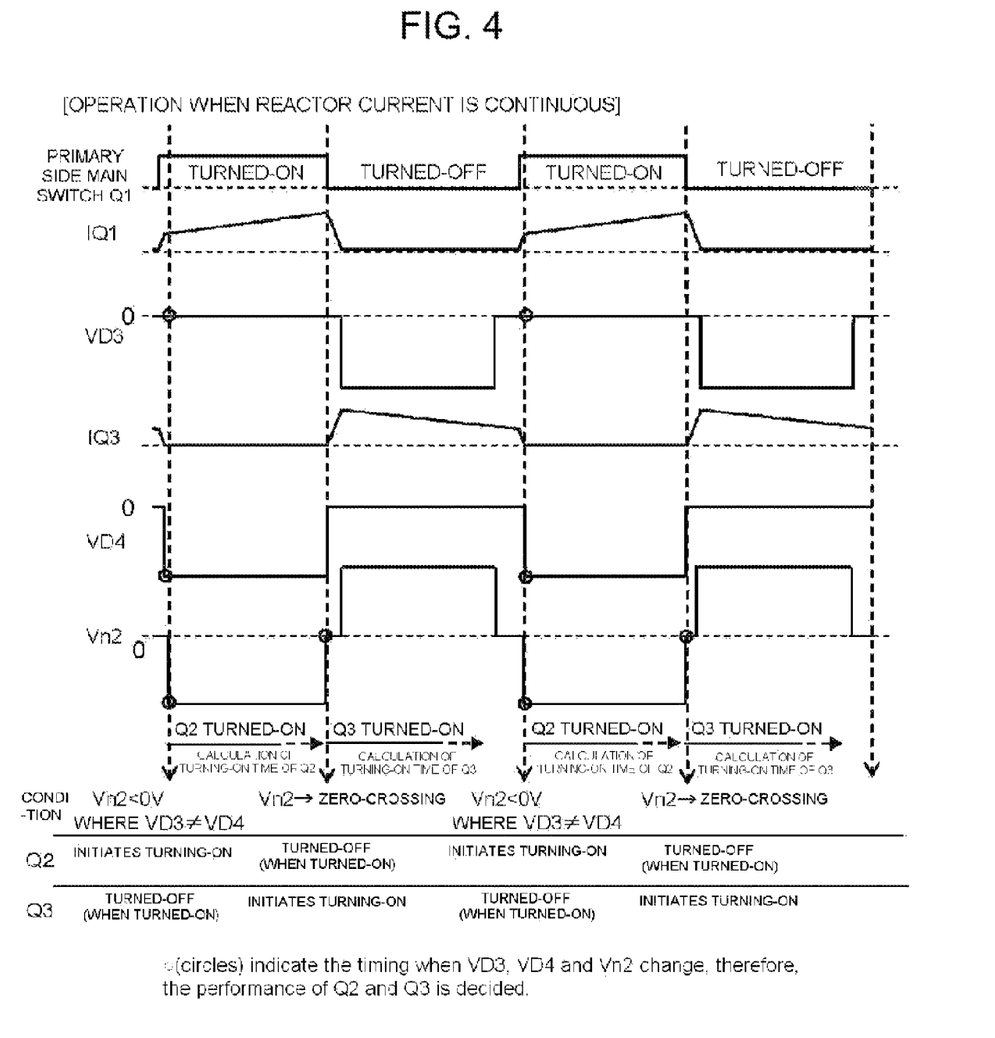
FIG. 4 is a waveform diagram showing the operation based on the control chart shown in FIG. 3 when the current in the reactor is continuous.
Figure 5:
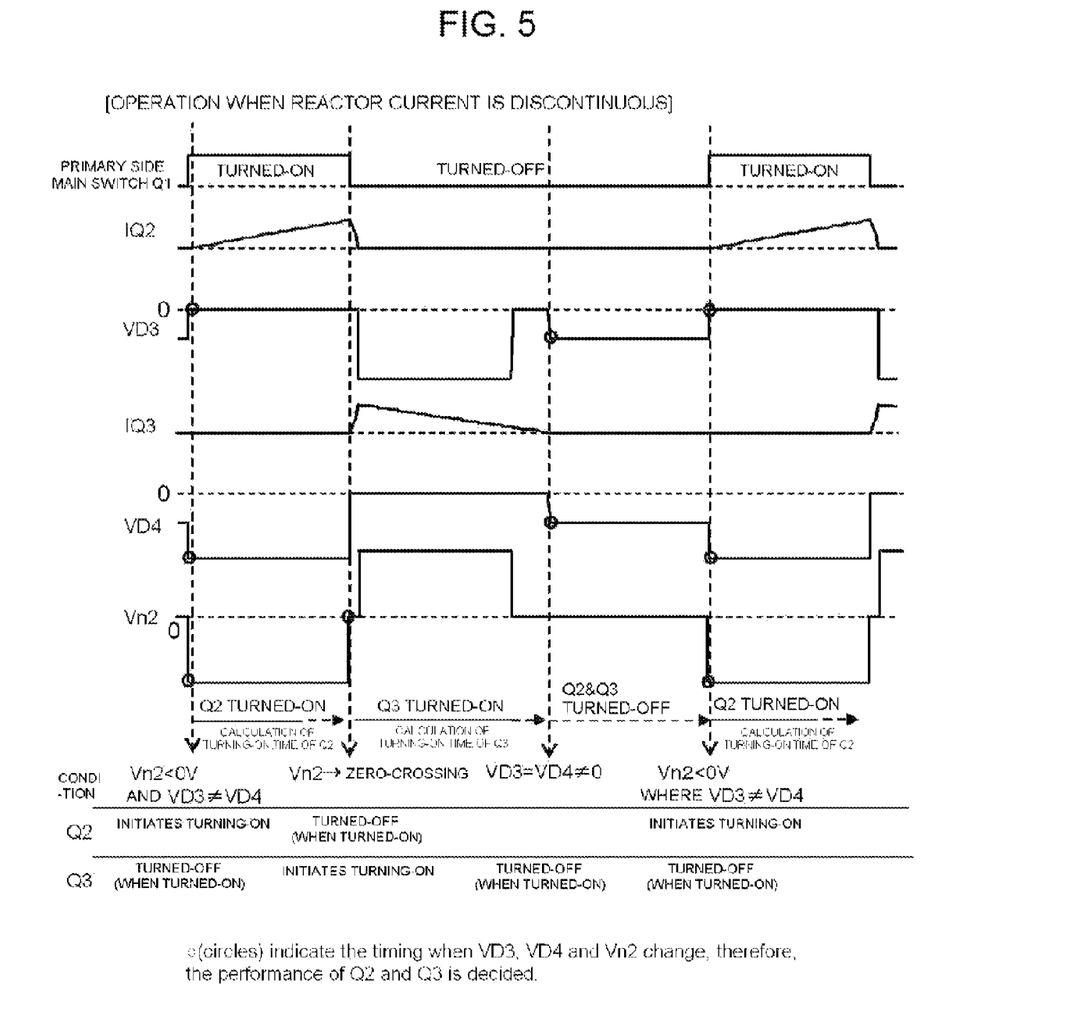
FIG. 5 is a waveform diagram showing the operation based on the control chart shown in FIG. 3 when the current in the reactor is discontinuous.

A control chart of the example for actualizing the above principle is shown in FIG. 3, and waveform diagrams in the operations of the example are shown in FIG. 4 and FIG. 5. Here, FIG. 4 is a waveform diagram showing the operation when the current in the reactor L is continuous and FIG. 5 is a waveform diagram showing the operation when the current in the reactor L is discontinuous.

In FIG. 3, settings of various kinds of variables are carried out first in step A and a decision is made in steps B and C as to whether the converter enters a rectifying operation or not. When the decision is made that the converter enters the rectifying operation, the MOSFET Q2 is made turned-on in step D with simultaneous initiation of the counting of an elapsed time, the DC output voltage Vo and the voltage Vn2 across the secondary winding of the transformer Tr are detected in step E, and the turning-on time width ton of the MOSFET Q1 is obtained in step F by the calculation based on the expression (1).

In step G, when the counting of the elapsed time reaches the turning-on time width ton of the MOSFET Q1 obtained by the calculation, the MOSFET Q2 is made turned-off and the freewheeling MOSFET Q3 is made turned-on. In steps H and I, a decision is made as to whether the mode is brought into a freewheeling mode or not. When the mode is brought into the freewheeling mode, the MOSFET Q3 is made turned-on in step J when the MOSFET Q3 is not made turned-off yet, the DC output voltage Vo and the voltage Vn2 across the secondary winding of the transformer Tr are detected in step K and the turning-off time width toff of the MOSFET Q1 is obtained in step L by the calculation based on the expression (2). In step M, a decision is made as to whether the current IL in the reactor L within the turning-off time width of the MOSFET Q1 obtained by the calculation is continuous or discontinuous. When the decision is made that the current IL is continuous, the MOSFET Q3 is turned-off after the turning-off time width of the MOSFET Q1 obtained by the calculation. When the decision is made that the current IL is discontinuous, the MOSFET Q3 is turned-off at the time at which the current becomes intermittent. Then, the operation is shifted to the next rectifying operation.

FIG. 4 shows waveforms in the operation when the current IL in the reactor L is continuous within one period and FIG. 5 shows waveforms in the operation when the current IL of the reactor L is intermittent in a freewheeling mode. In each case, the timing is detected at which the voltage Vn2 across the secondary winding n2 of the transformer Tr varies to perform zero-crossing with the zero level of the voltage Vn2 to thereby allow the detection of the turning-on and -off of the MOSFET Q1 on the primary side of the transformer Tr. Moreover, on the basis of the result of the decision on the polarity of the voltage Vn2 across the secondary winding n2 of the transformer Tr and the result of the decision as to whether or not the voltage VD3 across the rectifying MOSFET Q2 or the voltage VD4 across the freewheeling MOSFET Q3 is near zero, the timing of turning-on the MOSFET Q2 or the MOSFET Q3 is determined. When the current is intermittent (a discontinuous mode), both of the voltage VD3 across the MOSFET Q2 and the voltage VD4 across the MOSFET Q3 become negative with both of the MOSFET Q2 and the MOSFET Q3 being turned-off. Thus, on the basis of the condition, the MOSFET Q3 is made turned-off. Here, the threshold value for the voltage detection may have an arbitrary width. Moreover, by adding a control delay and the switching time of each of the MOSFETs, a dead time can be provided which makes each of the MOSFETs turned-off earlier than the turning-off time estimated beforehand.

By repeating the operation, it becomes possible to optimize the driving of the two MOSFETs Q2 and Q3 in the synchronous rectifier circuit, which reduces the time width within which a current flows in each of the diodes to reduce losses.

In the example, a circuit is shown in which a diode is connected in inverse-parallel to each of MOSFETs. The circuit, however, can be similarly actualized also with a parasitic diode of each MOSFET. Moreover, the switching circuit on the primary side can be similarly actualized also by a configuration without the reset winding.

In the invention, an optimum driving of the MOSFET for synchronous rectification on the secondary side is possible by detecting only voltages on the secondary side without using signals on the primary winding side of a transformer, which makes it possible to apply the invention to such a device as a switching power supply controlling IC.

While the present invention has been particularly shown and described with reference to the preferred embodiment thereof, it will be understood by those skilled in the art that the foregoing and other changes in form and details can be made therein without departing from the spirit and scope of the present invention.

What is claimed is:

1. A forward type DC-DC converter that converts a voltage of a DC input power supply to a specified DC output voltage insulated from the voltage of the DC input power supply, the DC-DC converter comprising:
    a series circuit of a primary side semiconductor switch and a primary winding of a transformer, the series circuit being connected in parallel to the DC input power supply;
    a rectifying diode that rectifies a voltage across a secondary winding of the transformer;
    a smoothing filter comprising a DC reactor and a smoothing capacitor, the smoothing filter that smoothes an output voltage of the rectifying diode;
    a freewheeling diode that freewheels a current in the DC reactor;
    a first MOSFET connected in inverse parallel to the rectifying diode; and
    a second MOSFET connected in inverse parallel to the freewheeling diode,
    a voltage across the smoothing capacitor being served as a DC output voltage,
    the DC output voltage being controlled by turning-on and -off operations of the first MOSFET and the second MOSFET based on periodical turning-on and -off operations of the primary side semiconductor switch, and
    an arithmetic circuit in which
    a turning-on time width of the first MOSFET is calculated by use of a time width within which a current flows in the DC reactor on a secondary side within a turning-off time width of the primary side semiconductor switch in a previous period, the DC output voltage and the voltage across the secondary winding of the transformer, and
    a turning-on time width of the second MOSFET is calculated by use of a turning-on time width of the primary side semiconductor switch immediately before a turning-on of the second MOSFET, the DC output voltage, and the voltage across the secondary winding of the transformer.

2. The forward type DC-DC converter as claimed in claim 1, wherein the turning-on time width of the primary side semiconductor switch is obtained by detecting a timing at which the voltage across the secondary winding of the transformer varies by a turning-on of the primary side semiconductor switch to perform zero-crossing with a zero level of the voltage across the secondary winding of the transformer, and the turning-off time width of the primary side semiconductor switch is obtained by detecting a timing at which the voltage across the secondary winding of the transformer varies by a turning-off of the primary side semiconductor switch to perform zero-crossing with the zero level of the voltage across the secondary winding of the transformer.

3. The forward type DC-DC converter as claimed in claim 1, wherein a timing of turning-on the first MOSFET is determined based on a result of a decision on a polarity of the voltage across the secondary winding of the transformer and a result of a decision as to whether or not a voltage across the first MOSFET is near zero, and
    a timing of turning-on the second MOSFET is determined based on a result of a decision on a polarity of the voltage across the secondary winding of the transformer and a result of a decision as to whether or not a voltage across the second MOSFET is near zero.

4. The forward type DC-DC converter as claimed in claim 1, wherein the voltage across the secondary winding of the transformer is obtained by a difference between a voltage across the first MOSFET and a voltage across the second MOSFET.

5. The forward type DC-DC converter as claimed in claim 1, wherein a voltage across the first MOSFET and a voltage across the second MOSFET are detected within the turning-on time width of the primary side semiconductor switch and, when both of the detected voltage across the first MOSFET and the detected voltage across the second MOSFET are negative voltages lower than a certain voltage near zero, a decision is made that a mode of a current in the DC reactor is in a discontinuous mode in which the current is intermittent.

6. The forward type DC-DC converter as claimed in claim 2, wherein a timing of turning-on the first MOSFET is determined based on a result of a decision on a polarity of the voltage across the secondary winding of the transformer and a result of a decision as to whether or not a voltage across the first MOSFET is near zero, and
    a timing of turning-on the second MOSFET is determined based on a result of a decision on a polarity of the voltage across the secondary winding of the transformer and a result of a decision as to whether or not a voltage across the second MOSFET is near zero.

7. The forward type DC-DC converter as claimed in claim 2, wherein the voltage across the secondary winding of the transformer is obtained by a difference between a voltage across the first MOSFET and a voltage across the second MOSFET.

8. The forward type DC-DC converter as claimed in claim 3, wherein the voltage across the secondary winding of the transformer is obtained by a difference between a voltage across the first MOSFET and a voltage across the second MOSFET.

9. The forward type DC-DC converter as claimed in claim 2, wherein a voltage across the first MOSFET and a voltage across the second MOSFET are detected within the turning-on time width of the primary side semiconductor switch and, when both of the detected voltage across the first MOSFET and the detected voltage across the second MOSFET are negative voltages lower than a certain voltage near zero, a decision is made that a mode of a current in the DC reactor is in a discontinuous mode in which the current is intermittent.

10. The forward type DC-DC converter as claimed in claim 3, wherein a voltage across the first MOSFET and a voltage across the second MOSFET are detected within the turning-on time width of the primary side semiconductor switch and, when both of the detected voltage across the first MOSFET and the detected voltage across the second MOSFET are negative voltages lower than a certain voltage near zero, a decision is made that a mode of a current in the DC reactor is in a discontinuous mode in which the current is intermittent.

11. The forward type DC-DC converter as claimed in claim 4, wherein a voltage across the first MOSFET and a voltage across the second MOSFET are detected within the turning-on time width of the primary side semiconductor switch and, when both of the detected voltage across the first MOSFET and the detected voltage across the second MOSFET are negative voltages lower than a certain voltage near zero, a decision is made that a mode of a current in the DC reactor is in a discontinuous mode in which the current is intermittent.

12. A DC-DC converter device comprising:
    a transformer having a primary side winding and a secondary side winding;
    a primary side switching device coupled to the primary side winding;
    a first switching device coupled to the secondary side winding;
    a second switching device coupled to the first switching device;
    an inductor coupled to the second switching device; and
    a control device configured to
        determine an on-time duration of the first switching device based at least partly on a conduction time of the inductor during an off-time of the primary side switching device in a previous period, a DC output voltage of the DC-DC converter device and a voltage across the secondary side winding, and
        determine an on-time duration of the second switching device based at least partly on an on-time duration of the primary side switching device before a turning on of the second switching device, the DC output voltage of the DC-DC converter device and the voltage across the secondary side winding.

13. The DC-DC converter device of claim 12, wherein the control device comprises at least one voltage detector coupled to a calculation unit, the calculation unit configured to output drive signals to the first switching device and the second switching device based at least partly on an input from the at least one voltage detector.

14. The DC-DC converter device of claim 13, wherein the at least one voltage detector includes
    a DC output voltage detector to detect the DC output voltage of the DC-DC converter device,
    a first switching device voltage detector to detect a voltage across the first switching device, and
    a second switching device voltage detector to detect a voltage across the second switching device.

15. The DC-DC converter device of claim 14, wherein the control device further comprises a frequency device configured to supply timing detection signals to the calculation unit.

* * * * *